(12) United States Patent
Inomata et al.

(10) Patent No.: US 6,968,161 B2
(45) Date of Patent: Nov. 22, 2005

(54) PORTABLE TELEPHONE

(75) Inventors: Yoji Inomata, Yokohama (JP);
Yasunobu Ikeda, Yokohama (JP);
Ryuichi Toyoda, Yokohama (JP); Akira Takahashi, Duluth, GA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 591 days.

(21) Appl. No.: 09/796,828

(22) Filed: Mar. 1, 2001

(65) Prior Publication Data

US 2001/0024945 A1    Sep. 27, 2001

(30) Foreign Application Priority Data

Mar. 3, 2000    (JP)    ............... P. 2000-059054

(51) Int. Cl.⁷ ............................................. H04B 1/38
(52) U.S. Cl. ............... 455/90.3; 455/575.1; 455/575.3; 455/575.4; 455/575.8; 455/566; 455/569.1; 379/433.11; 379/433.13; 379/428.01; 379/420.04
(58) Field of Search ............... 455/90.1, 95, 568.1, 455/568.3, 568.4, 568.8, 569, 90.3, 569.1, 455/575.3; 379/433.01, 433.02, 433.03, 428, 379/431

(56) References Cited

U.S. PATENT DOCUMENTS

| | | | |
|---|---|---|---|
| 5,303,291 A | * | 4/1994 | Takagi et al. ........... 379/433.13 |
| 5,383,091 A | | 1/1995 | Snell |
| 5,440,629 A | * | 8/1995 | Gray ...................... 379/433.12 |
| 5,485,517 A | * | 1/1996 | Gray ...................... 379/433.13 |
| 5,517,683 A | * | 5/1996 | Collett et al. ............ 455/575.1 |
| 5,555,449 A | * | 9/1996 | Kim ........................ 455/575.7 |
| 5,711,013 A | * | 1/1998 | Collett et al. ............... 455/558 |
| 5,940,502 A | * | 8/1999 | Hirai et al. ................. 379/446 |
| 5,966,669 A | * | 10/1999 | Kenmochi et al. .......... 455/557 |
| 6,002,945 A | * | 12/1999 | McDuffee ................ 455/556.1 |
| 6,073,034 A | * | 6/2000 | Jacobsen et al. ............ 455/566 |
| 6,091,815 A | * | 7/2000 | Ryu et al. .............. 379/433.13 |
| 6,249,672 B1 | * | 6/2001 | Castiel .................... 455/575.4 |
| 6,363,243 B1 | * | 3/2002 | Persson et al. ............. 455/90.1 |
| 6,470,175 B1 | * | 10/2002 | Park et al. ................. 455/90.1 |

FOREIGN PATENT DOCUMENTS

| | | |
|---|---|---|
| GB | 2 288 911 | 11/1995 |
| GB | 2 293 517 | 3/1996 |
| GB | 2 298 759 | 9/1996 |
| GB | 2 327 009 | 1/1999 |
| GB | 2 331 888 | 6/1999 |
| GB | 2 334 850 | 9/1999 |
| JP | 8-65734 | 3/1996 |
| JP | 11-252225 | 9/1999 |
| WO | WO 01/17205 | 3/2001 |

* cited by examiner

*Primary Examiner*—Marceau Milord
(74) *Attorney, Agent, or Firm*—Pearne & Gordon LLP

(57) ABSTRACT

A portable telephone to which additional function units, such as a flip unit and a slide unit, that provide additional functions for the main body of a portable telephone, are easily mounted on the case of a basic unit that includes only the essential units required for speech. One or more of an LCD bezel 40, a flip cover 50, a keypad bezel 60, grips 70, a keypad slide cover 80 and a slide cover 90, which are additional function units, are mounted on a basic unit 20. Therefore, this arrangement can cope with a request from a user who desires to alter a portable telephone he or she purchased to obtain a model he or she favors.

17 Claims, 18 Drawing Sheets

PORTABLE TELEPHONE

BACKGROUND OF THE INVENTION

The present invention relates to a portable telephone, and in particular relates to a portable telephone whereon function units, such as a flip unit and a slide unit that provide additional functions, can easily be mounted on the case of a basic unit that includes only the minimum means required for speech.

Conventionally, once a flip unit is mounted in the assembly process, the portable telephone on which the flip unit is mounted can not be altered to obtain a portable telephone having a flipless structure. Further, even when a slide can be removed from a portable telephone having a slide structure., the portable telephone can not be altered to obtain a model having another structure, such as a flip structure.

As is explained above, conventionally, when a user selects and purchases a portable telephone model having a specific structure, no alteration of the unit is possible, and thus, if originally a user purchased a flip structured model but has now decided that a slide structured model would better satisfy his or her needs, to obtain the model that he or she favors, the user's only alternative is to purchase a new telephone.

SUMMARY OF THE INVENTION

To resolve this problem, it is one objective of the invention to provide a portable telephone whereto additional function units, such as a flip unit and a slide unit that provide additional functions when mounted on the case of the main body of a portable telephone, can be easily mounted on a basic unit that includes only the minimum means required for speech.

According to a first aspect of the invention, a portable telephone comprises: a basic unit, in which essential components required for communication, i.e., a microphone, an earphone, a display unit, a key console unit, an antenna, a wireless communication unit, a power source and a controller, are stored in a case constituting a main body, and an additional function unit mounting section is provided for the basic unit for mounting an additional function unit, which provides an additional function, on the case of the main body.

With this arrangement, since at any time after a portable telephone is purchased an additional function unit can be mounted thereon, the telephone can be altered to obtain a model favored by a user.

According to a second aspect of the invention, for the portable telephone of the first aspect, at least one of a flip unit, a slide unit, an LCD bezel unit, a keypad bezel unit and a grip unit can be mounted as the additional function unit.

With this arrangement, since at any time after a portable telephone is purchased an additional function unit can be mounted thereon, the telephone can be altered to obtain a model favored by a user.

According to a third aspect of the invention, for the portable telephone of the first or the second aspect, the additional function unit mounting section includes at least one of a rail, an engagement section, which includes raised and recessed members, an attachment groove, and an engagement hole.

With this arrangement, since at any time after a portable telephone is purchased an additional function unit can be mounted thereon, the telephone can be altered to obtain a model favored by a user.

According to a fourth aspect of the invention, for the portable telephone of the first aspect, a single or multiple additional function units can be selected for mounting on the basic unit.

With this arrangement, since at any time after a portable telephone is purchased one or more additional function units can be mounted thereon, the telephone can be altered to obtain a model favored by a user.

According to a fifth aspect of the invention, for the portable telephone of the first aspect, the additional function units available for mounting on the basic unit are detachable. With this arrangement, it is easy to add, or remove, an additional function unit.

According to a sixth aspect of the invention, for the portable telephone of the first aspect, a grip having raised and recessed surfaces is formed on the sides of the additional function units, excluding the grip unit. This arrangement provides an improved grip for a user.

According to a seventh aspect of the invention, for the portable telephone of the first aspect, the grip surfaces of the grip unit are extended so as to serve as covers for protecting the sides of the case. This arrangement, as well as protecting the sides of the case, provides an improved grip for a user.

According to an eighth aspect of the invention, for the portable telephone of the first aspect, a magnifying lens is provided for the LCD bezel unit and the keypad bezel unit, and contents displayed on these units are enlarged for reading. With this arrangement, even a person having impaired vision can easily read the displayed contents.

DETAILED DESCRIPTION OF THE PREFERRED EMBODIMENTS

The preferred embodiment of the invention will now be described while referring to the accompanying drawings.

Figure 1:
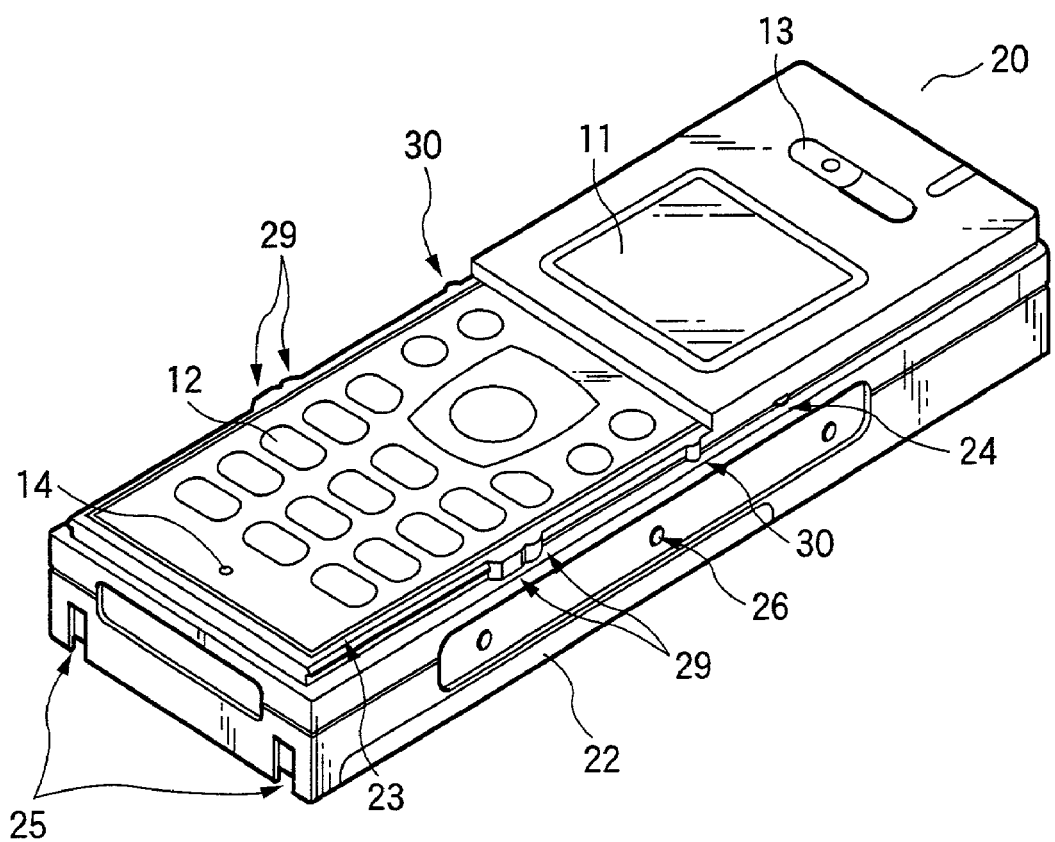
FIG. 1 is a perspective view of the arrangement of the basic unit of a portable telephone according to one embodiment of the invention.

FIG. 1 is a perspective view of the configuration of the basic unit of a portable telephone according to one embodiment of the invention. In FIG. 1, the basic unit 200 of a portable telephone comprises the minimum components required for speech, a microphone 14, an earphone 13, a display device 11, a key console unit 12 for a navigation key and number keys, an antenna (not shown), a wireless communication unit (not shown), a controller (not shown) and a battery storage unit 22, provided as a power source. These components are stored in a single case.

The basic unit 20 further comprises rails 23, engagement members 24, 29 and 30, which include notched portions, attachment grooves 25, and engagement holes 26, which are used for mounting additional function units, such as a flip unit or a slide unit, that will be described later.

Figure 2:
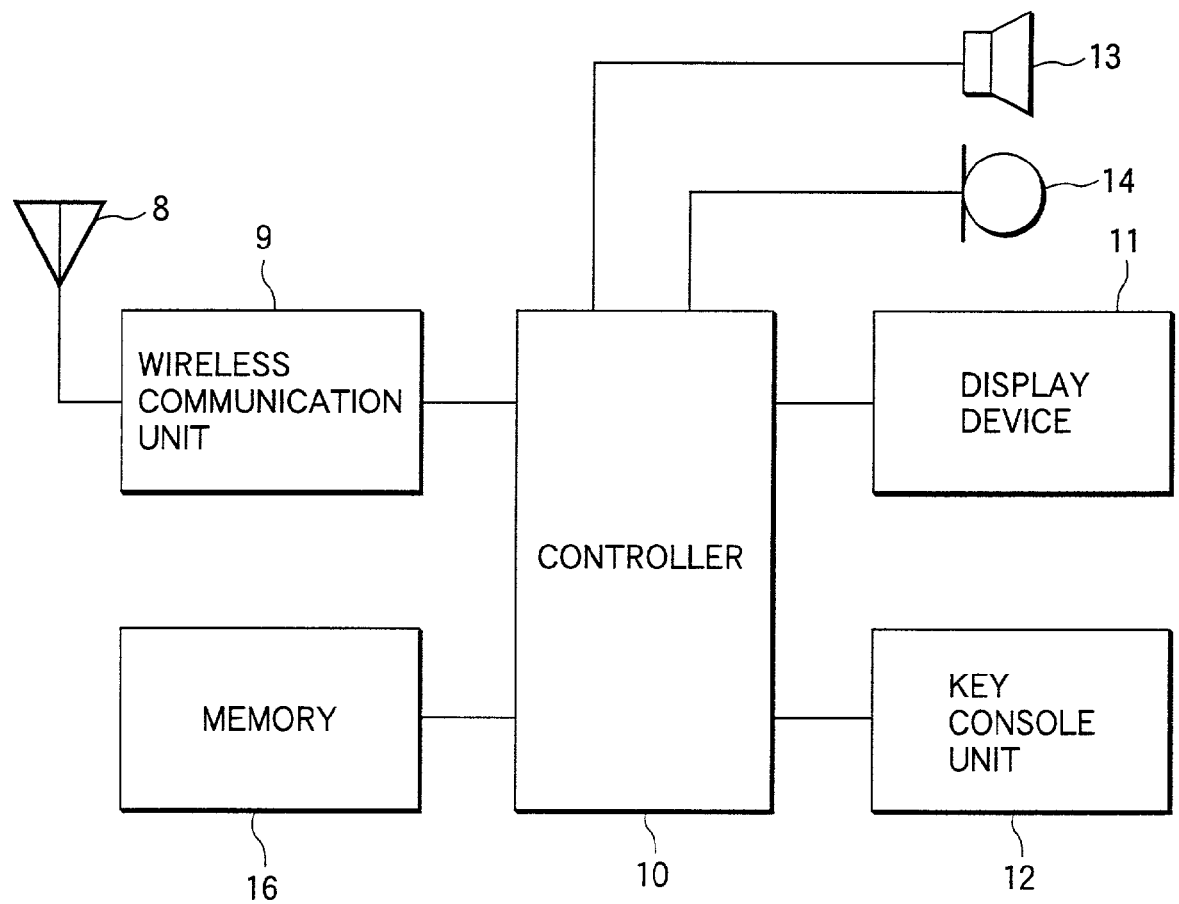
FIG. 2 is a circuit block diagram for implementing the basic functions of the portable telephone of the invention.

FIG. 2 is a block diagram of a circuit that, in accordance with the invention, implements the basic functions of the portable telephone. In FIG. 2, a radio wave is received at the antenna 8 and is transmitted to a receiver (not shown), in a wireless communication unit 9, that transmits the received information to a controller 10. Thereafter, the controller 10 displays, on a display device 11, such as a liquid display device, the received information, which may be a telephone number. The controller 10 also converts the received information into speech information, and outputs it through a receiver loudspeaker 13. Further, the microphone 14 receives the speech of a user and transmits it to the controller 10, and the controller 10 employs a transmitter (not shown), of the wireless communication unit 9, and the antenna 8 to transmit the speech to a recipient. The controller 10 stores speech information, such as speech contents, in or reads information from a memory 16. The key console unit 12, which includes number keys, is manipulated to transmit a signal to the controller 10 or to store personal information, such as the information included in an electronic telephone book, in the memory 16 via the controller 10. The circuit blocks are stored in the case shown in FIG. 1.

Figure 3:
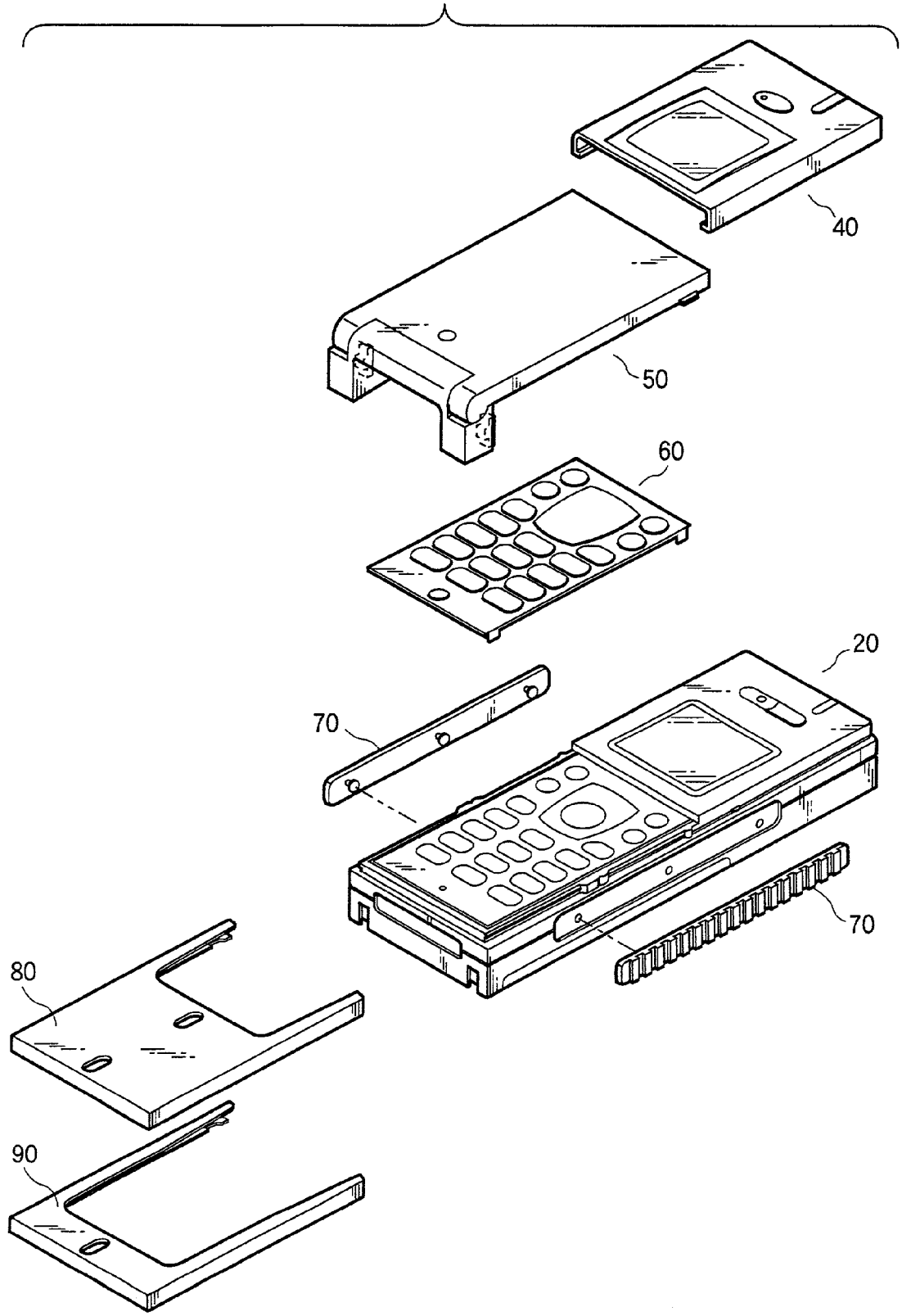
FIG. 3 is a perspective view of example additional function units to be mounted on the basic unit.

FIG. 3 is a perspective view of the additional function units that can be mounted on the basic unit. Specifically, relative to the basic unit and reading from the top, an LCD bezel 40, a flip cover 50, a keypad bezel 60, a grip 70, a keypad slide cover 80, and a slide cover 90.

Figure 4A:
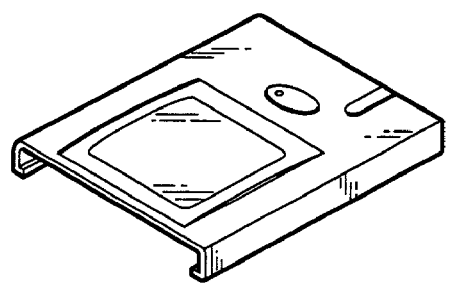
FIG. 4 is a diagram showing variations of the LCD bezel in FIG. 3.
Figure 4B:
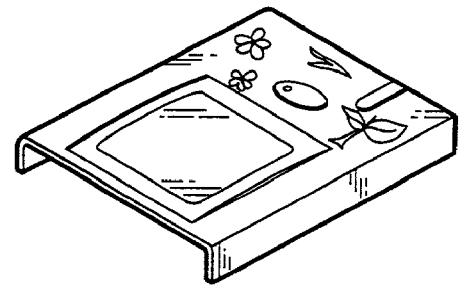
Figure 4C:
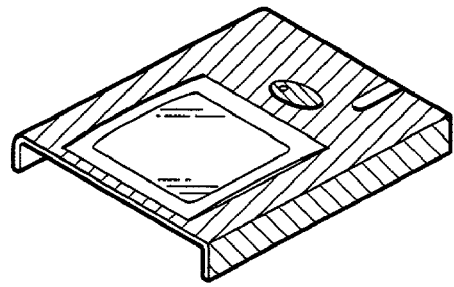
Figure 4D:
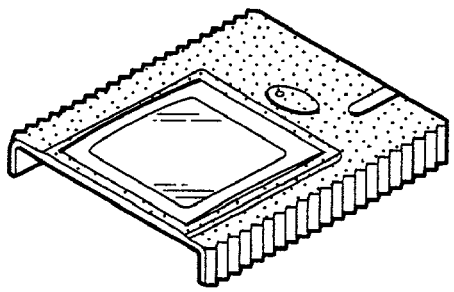

FIGS. 4A to 4D are diagrams showing variations of the LCD bezel 40 in FIG. 3. In FIG. 4A, the same LCD bezel as the one in FIG. 3 is shown. In FIG. 4B, a variety of illustrations are provided for the top face of the LCD bezel, which permits a user to select a favorite illustration. In FIG. 4C, the LCD bezel is a solid color, which permits a user to select his or her favorite color. In FIG. 4D, the solid color LCD bezel, for which indentations have been formed along the sides, permits a user to not only select a favorite color but, at the same time, to select a grip.

Figure 5A:
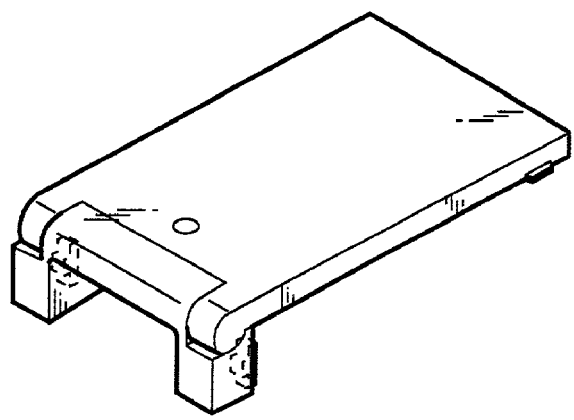
FIG. 5 is a diagram showing variations of the flip cover in FIG. 3.
Figure 5B:
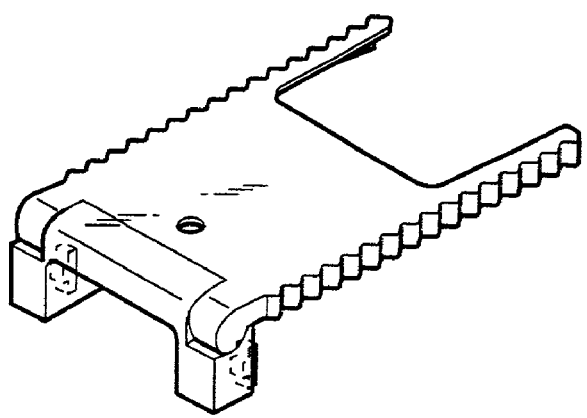

FIGS. 5A and 5B are diagrams showing variations of the flip cover, 50 shown in FIG. 3. In FIG. 5A, the same flip cover is shown as in FIG. 3. In FIG. 5b, a flip cover is shown that not only covers frequently used keys but that provides indentations along its sides that can serve as a grip.

Figure 6A:
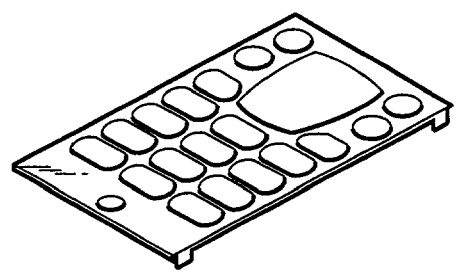
FIG. 6 is a diagram showing variations of the keypad bezel in FIG. 3.
Figure 6B:
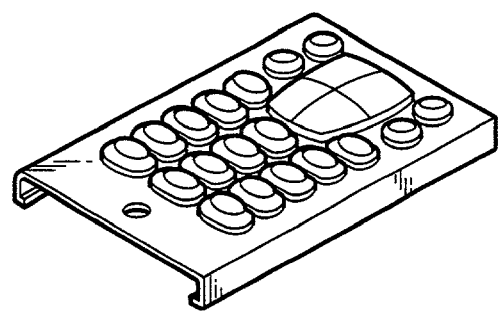
Figure 6C:
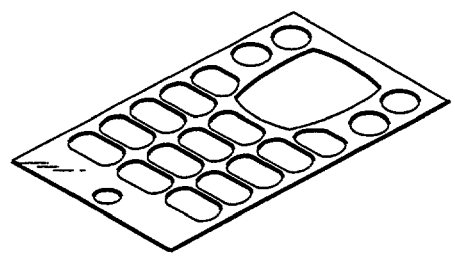

FIGS. 6A to 6E are diagrams showing variations of the keypad bezel 60 shown in FIG. 3. The same keypad bezel as is shown in FIG. 3 is shown in FIG. 6A. The keypad bezel shown in FIG. 6B is designed to slide along rails on the basic unit 20. While the keypad bezel in FIG. 6C is designed to remove a height difference from the surface of the key console unit 12 of the basic unit 20, so that this keypad bezel can be located on the same plane as the key console unit 12.

Figure 6D:
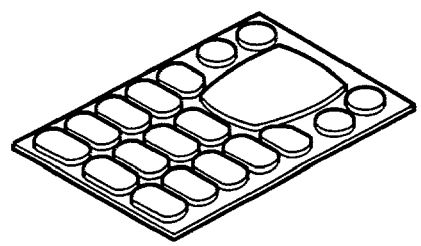
Figure 6E:
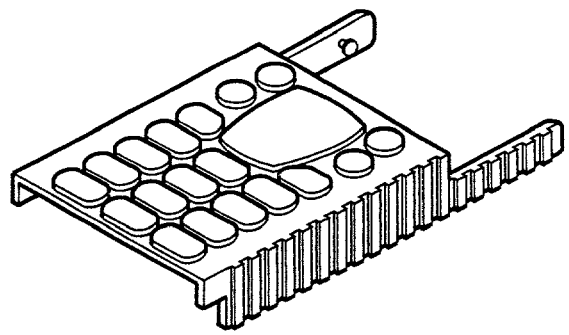

In FIG. 6D, the keypad bezel includes a magnifying lens function for enlarging embossed, incised or printed characters on individual keys of the key console unit 12 of the basic unit 20. And in FIG. 6E, indentations, which are formed on the sides of the keypad bezel in FIG. 6D, serve as a grip, while securely engaging the engagement holes 26 of the basic unit 20.

Figure 7A:
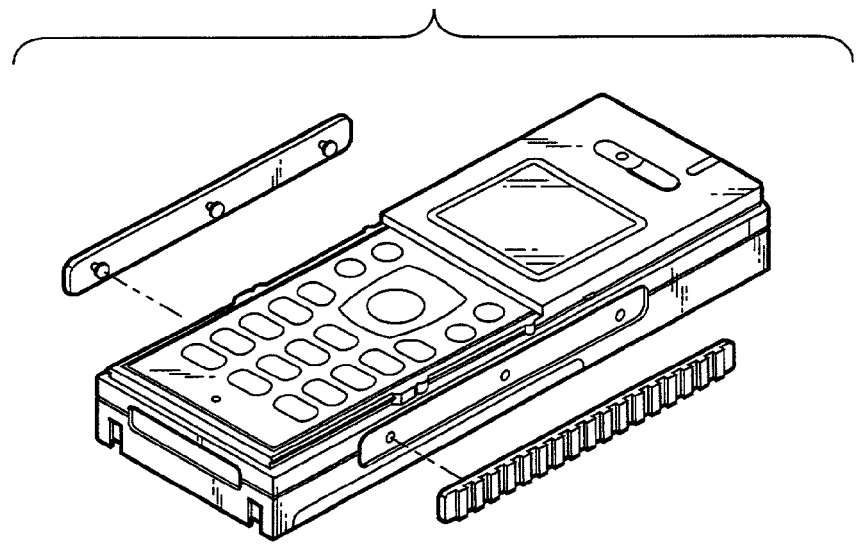
FIG. 7 is a diagram showing variations of the grips in FIG. 3.
Figure 7B:
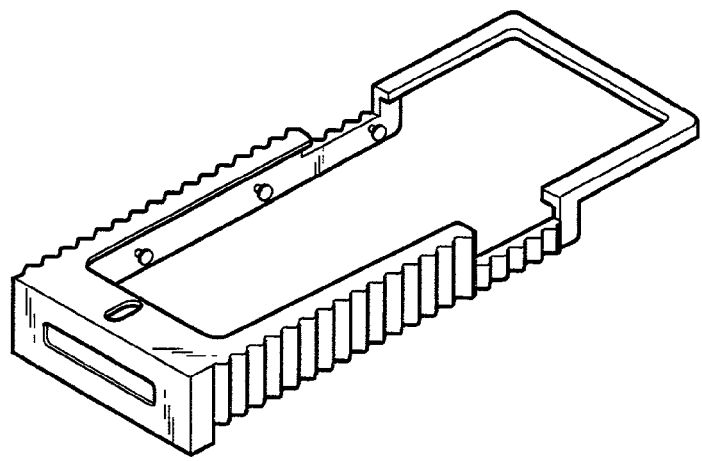
Figure 7C:
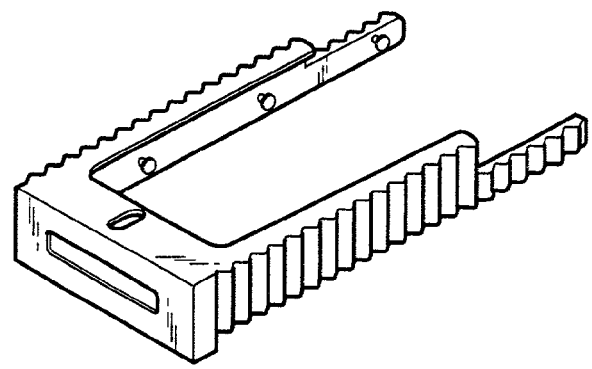

FIGS. 7A to 7C are diagrams showing variations of the grips 70. The same grips shown in FIG. 3 are shown in FIG. 7A, and securely engage with the engagement holes. 26 of the basic unit 20. In FIG. 7B, grips are formed that cover most of the edges of the basic unit 20 and that extend further than the range covered by the grip in FIG. 7A. It should be noted that, as in FIG. 7A, the grip in FIG. 7B engages the engagement holes 26 of the basic unit 20. In FIG. 7C, the grip is shaped like the lower halt portion of the grip in FIG. 7B. Here it should be noted that, as in FIG. 7A, the grip can engage the engagement holes 26 of the basic unit 20.

Figure 8A:
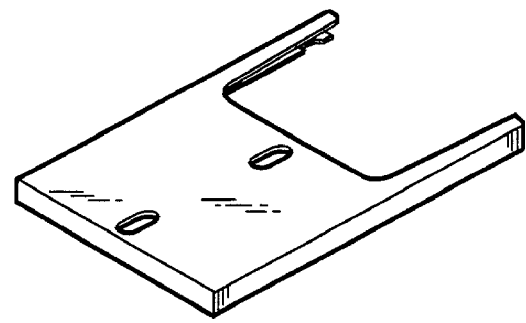
FIG. 8 is a diagram showing variations of the keypad slide cover in FIG. 3.
Figure 8B:
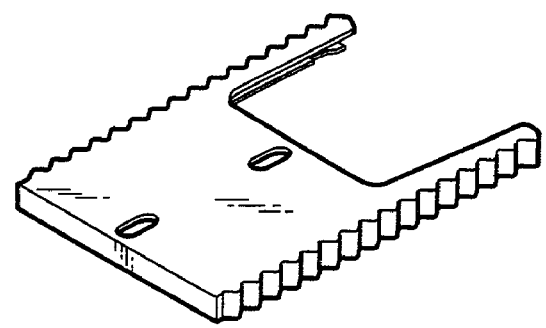

FIGS. 8A and 8B are diagrams showing variations of the keypad slide cover 80. In FIG. 8A, the same keypad slide cover as in FIG. 3 is shown, whereas in FIG. 8B, indentations formed along the sides of the keypad slide serve as a grip.

Figure 9A:
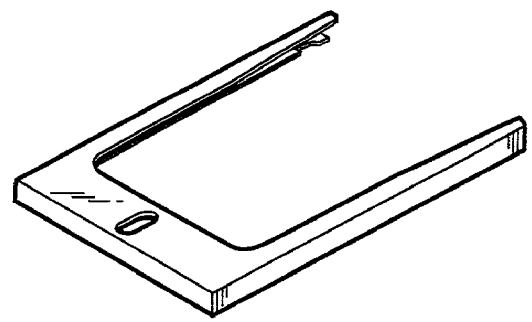
FIG. 9 is a diagram showing variations of the slide cover in FIG. 3.
Figure 9B:
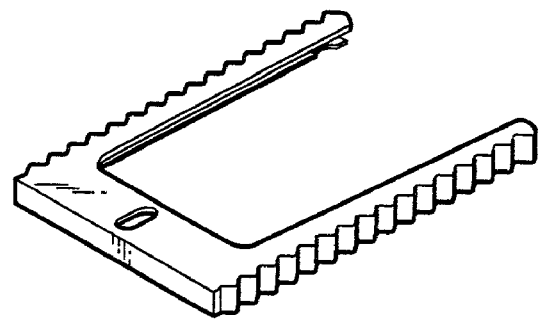

FIGS. 9A and 9B are diagrams showing variations of the slide cover 90. In FIG. 9A, the same slide cover as in FIG. 3 is shown, whereas in FIG. 9B, indentations formed along the sides of the slide serve as a grip.

Figure 10:
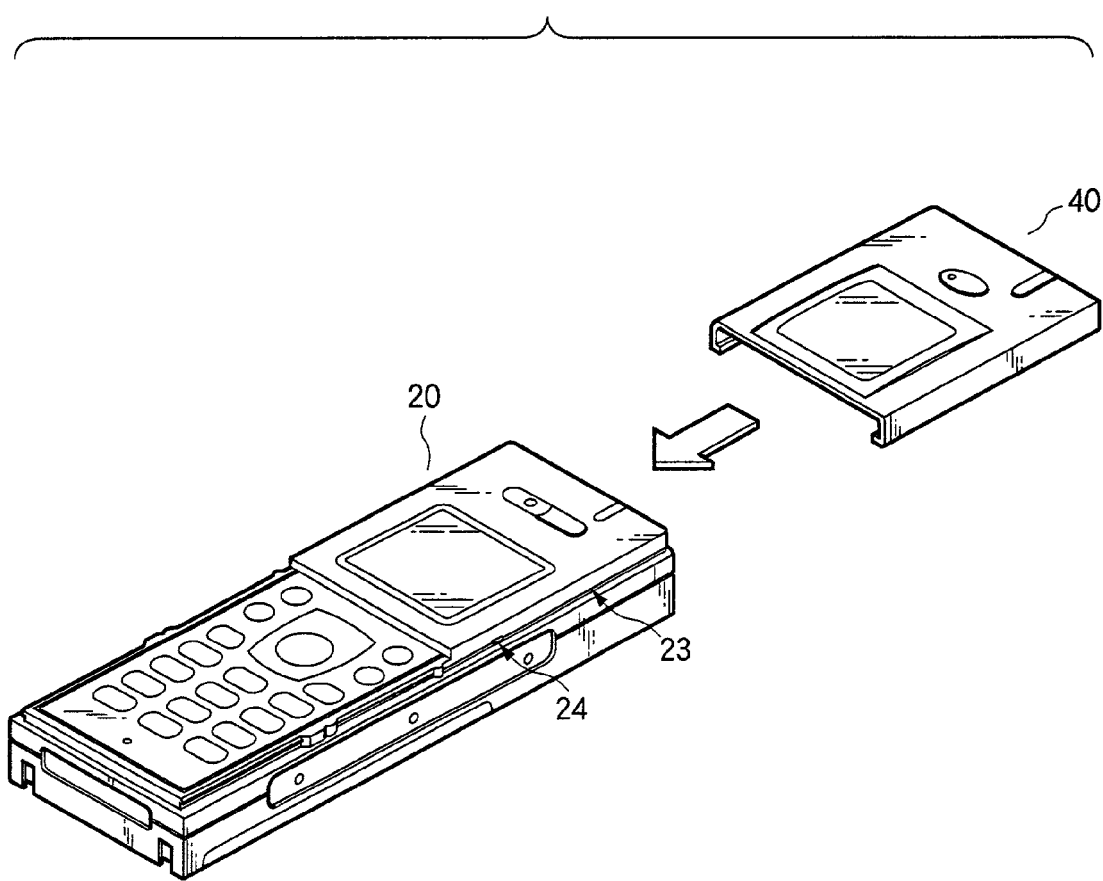
FIG. 10 is a perspective view of the state wherein the LCD bezel in FIG. 3 is mounted on the basic unit.

An explanation will now be given for a specific example wherein additional function units are mounted on the basic unit 20. FIG. 10 is a perspective view of the state wherein the LCD bezel 40 in FIG. 3 is to be mounted on the basic unit 20. The LCD bezel 40 is mounted on the rails 23, extending along the basic unit 20, i.e., in the direction in which the earphone is located. The LCD bezel 40 passes along the rails 23, over protrusions on the engagement member 24, and is retained and secured and prevented from slipping upward and off.

Figure 11A:
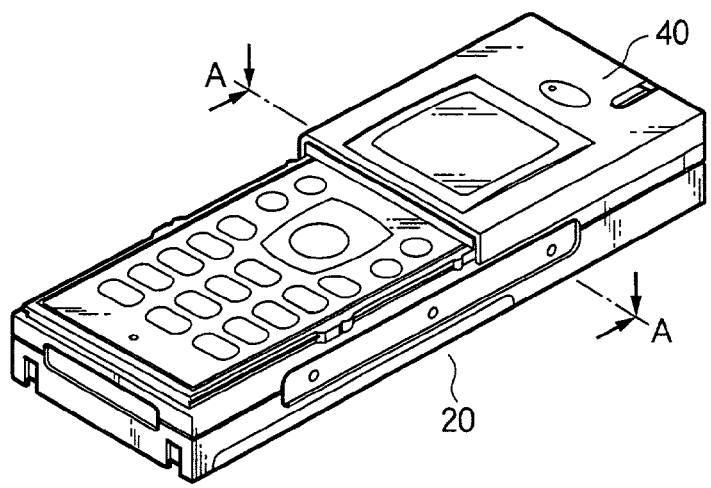
FIG. 11A is a perspective view of the state wherein the LCD bezel is fixed at a predetermined position.
Figure 11B:
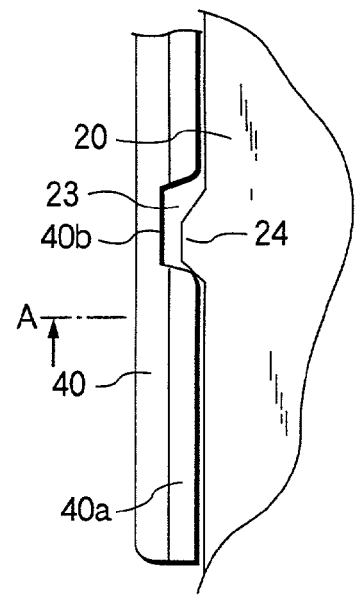
FIG. 11B is a top view of the left side of the device at position A—A.

FIG. 11A is a perspective view of the state wherein the LCD bezel 40 is fixed in a predetermined location. FIG. 11B is a top view of the left side of the bezel unit 40 along the line A 3A in FIG. 11A. The LCD bezel 40 includes sliders 40a that slide along the rails 23, and notches 40b that are formed in the sliders 40a.

In FIG. 11B, the LCD bezel 40 is mounted on the rails 23 extending from the top of the basic unit 20, i.e., in the direction wherein the earphone is located, and is slid along the rails 23. When the sliders 40a pass over the protrusions on the engagement member 24, the LCD bezel 40 is engaged and fixed in that position. Thus, the LCD bezel 40 is prevented from sliding upward and off.

Figure 11D:
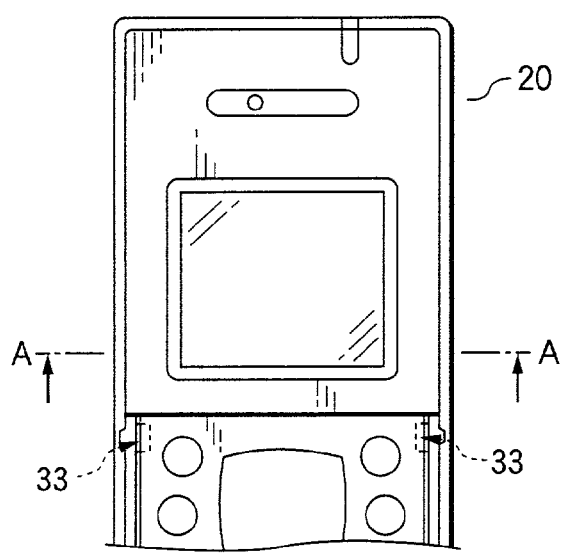
FIG. 11D is a diagram showing the position A—A on the basic unit.
Figure 11C:
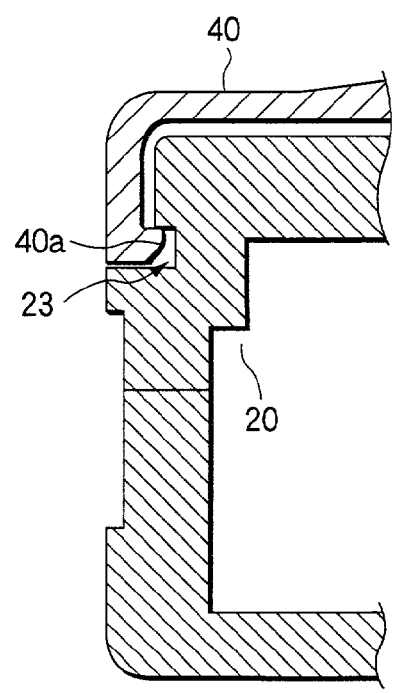
FIG. 11C is a cross-sectional view of the left side of the device at position A—A.

FIG. 11C is a cross-sectional view of the left side of the bezel unit 40 taken along the line A—A in FIG. 11A. It should be understood that in FIG. 11C the LCD bezel 40 engages the rails 23. FIG. 11D is a diagram showing the basic unit 20. Position A—A in FIG. 11D corresponds to the cross-section of the basic unit 20 and to the line A—A in FIG. 11A, and a partial cross-section is shown in FIG. 11c. In FIG. 11D, holes 33 are formed into, which the pawls of the keypad bezel 60 in FIG. 3 are inserted. The mounting of the keypad bezel 60 in FIG. 3 will be explained later while referring to FIG. 15.

Figure 12A:
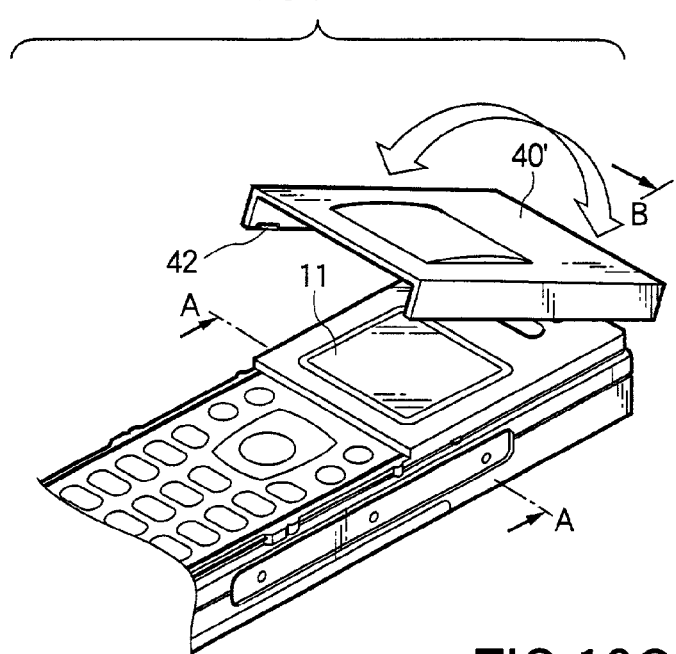
FIG. 12 is a perspective view of the state wherein an LCD bezel is employed that has a structure differing from the structures in FIGS. 10 and 11.

FIGS. 12A to 12D are perspective views of the state wherein an LCD bezel 40' has a structure differing from those in FIGS. 10 and 11. In FIG. 12A, the LCD bezel 40' is slipped over the top of the display device 11, in the same manner as a cover would be placed over the display device 11. Then, first pawls 42 of the LCD bezel 40' engage positions whereat protrusions on the engagement member 24 of the rails 23 are bypassed. Thus, the LCD bezel 40' can be prevented from slipping off the top face or from sliding upward.

Figure 12B:
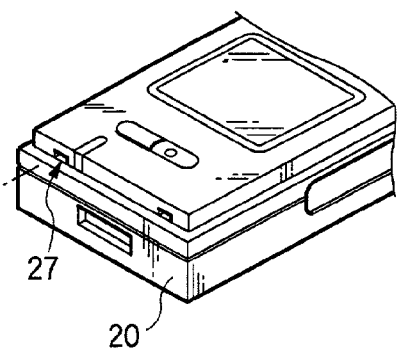
Figure 12C:
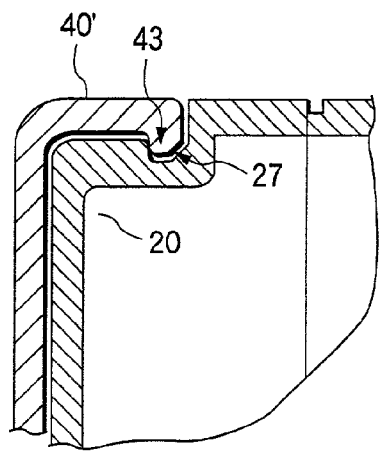
Figure 12E:
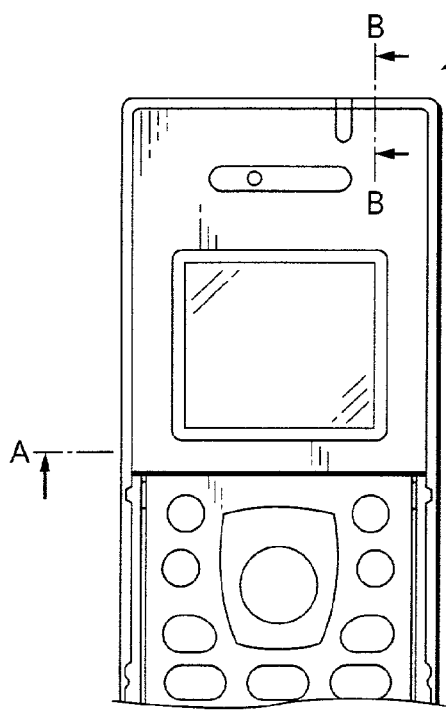

Further, as is shown in FIG. 12B, second pawls 43 formed on the upper portion of the LCD bezel 40' are fitted into holes 27 in the basic unit 20 to prevent the LCD bezel 40 from moving downward. This state is shown in FIG. 12C, a cross-sectional view taken along B—B in FIG. 12B.

Figure 12D:
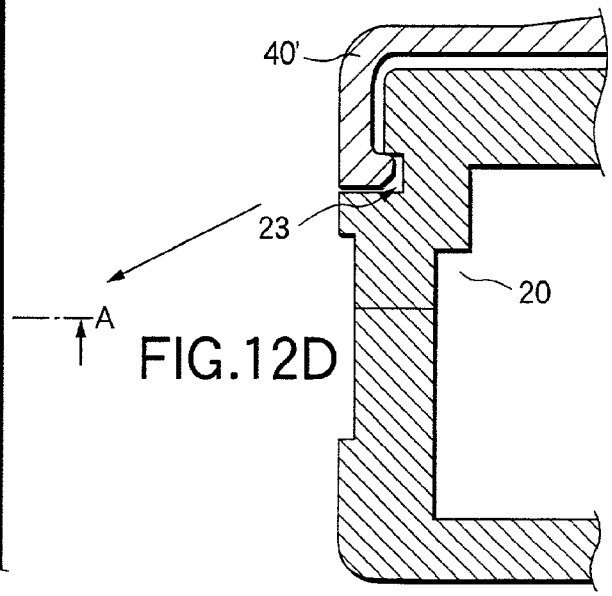

FIG. 12D is a front cross-sectional view of the left side of the LCD bezel unit 40' taken long A—A in FIG. 12A. It can be easily understood from FIG. 12D how the LCD bezel 40' engages the rails 23. It should be noted that a cross section taken either at position A—A or B—B in FIG. 12A or 12B is shown in FIG. 12D for the basic unit 20.

The LCD bezels 40 and 40' shown in FIGS. 10 and 12 correspond to those in FIGS. 4A and 4B; however, the LCD bezels shown in FIGS. 4C and 4D may be employed instead.

Figure 13:
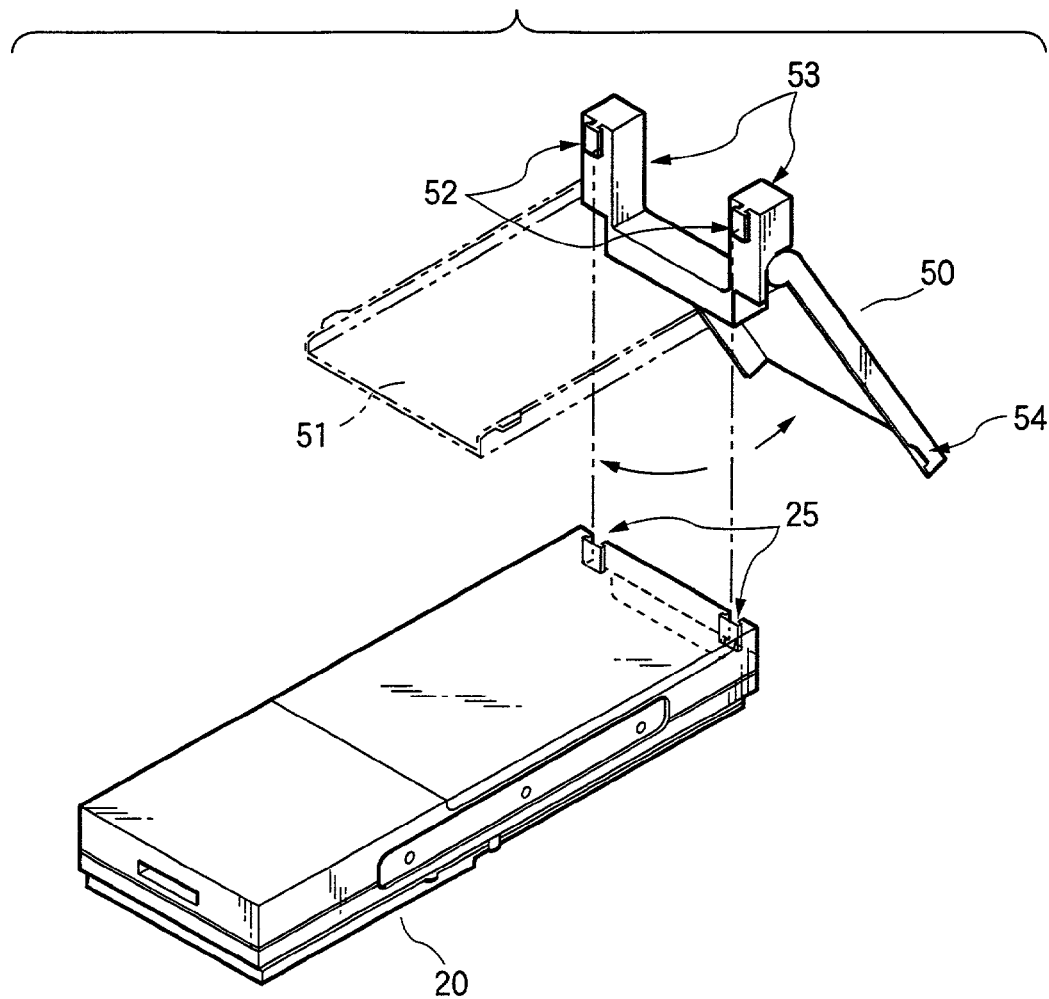
FIG. 13 is a perspective view of the state wherein the flip cover in FIG. 3 is mounted on the basic unit.

FIG. 13 is a perspective view of the state wherein the flip cover 50 shown in FIG. 3 is to be mounted on the basic unit 20. In FIG. 13, the basic unit 20 is reversed, unlike the view shown in FIG. 3, and the attachment grooves 25 are formed in the basic unit 20. Grips 54 and hinges (not shown) are provided for the flip cover 50, and a lid 51 can be opened and closed by holding the grips 54. Further, engagement pawls 52 are formed at the distal ends of hinge supports 53 that are to engage the attachment grooves 25. When the engagement pawls 52 are fitted into the attachment grooves 25, the flip cover 50 can be mounted on the basic unit 20.

Figure 14:
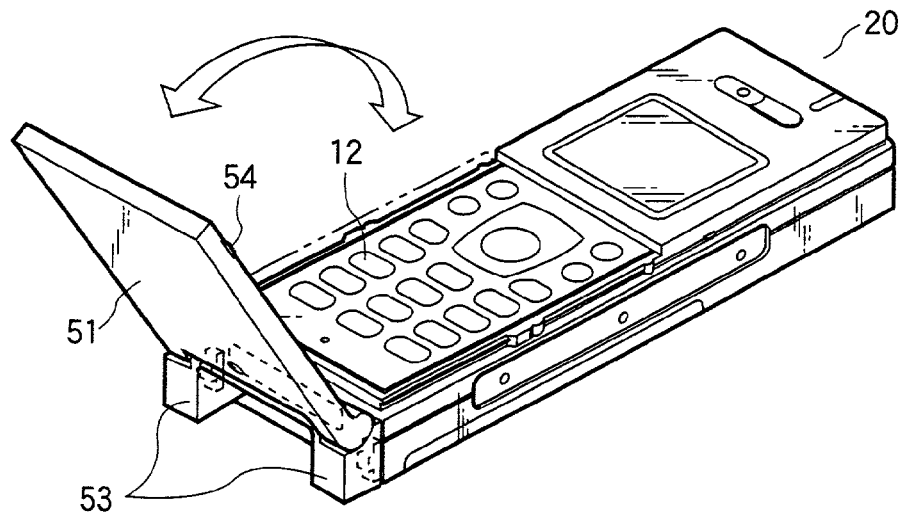
FIG. 14 is a front perspective view, unlike the view FIG. 13, of the state wherein the flip cover is open or closed.

FIG. 14 is a front perspective view, unlike in FIG. 13, of the basic unit 20 wherein the mounted flip cover 50 is open or closed. As is shown in FIG. 14, the lid 51 is designed so that it covers the key console unit 12, and the hinge supports 53 are designed so that they do not interfere with the mounting of external connection terminals that may be provided. Since the engagement pawls 52 engage the attachment grooves 25 along the hinge supports 53, and since the lid 51 is opened and closed at hinges (not shown), the engagement pawls 52 are not disengaged from the attachment grooves 25, even when the lid 51 is opened and closed. The flip cover 50 in FIGS. 13 and 14 corresponds to that in FIG. 5A; however, the flip cover 50 in FIG. 5B may also be employed.

Figure 15A:
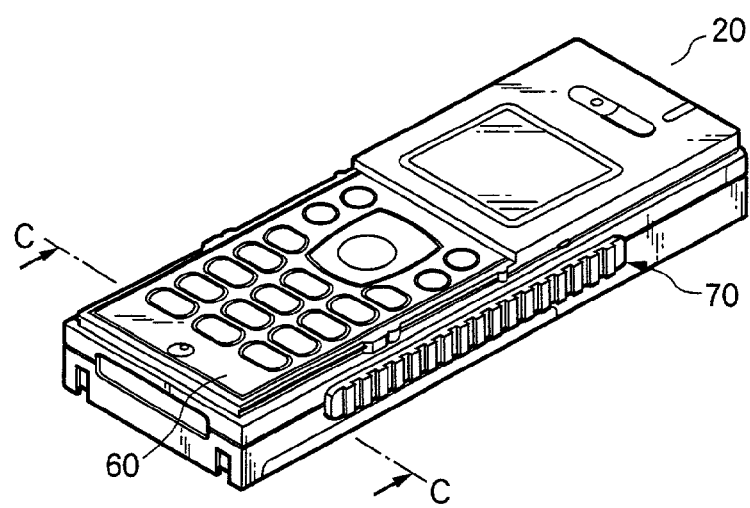
FIG. 15A is a perspective view of the state wherein the keypad bezel and the grips in FIG. 3 are mounted on the basic unit.

FIG. 15A is a perspective view of the state wherein the keypad bezel 60 in FIG. 3 and the grips 70.are mounted on the basic unit 20. In FIG. 15a, the keypad bezel 60 is mounted on the key console unit 12 of the basic unit 20 in FIG. 1, and the grips 70 are attached to the engagement holes 26 formed in the sides of the basic unit 20 in FIG. 1.

Figure 15B:
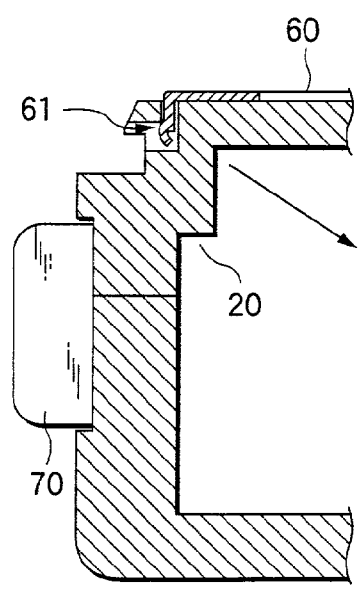
FIG. 15B is a cross-sectional view taken along line C—C in FIG. 15A.

FIG. 15 is a cross-sectional view taken along C—C in FIG. 15A, and an enlarged diagram shows the right side of the keypad bezel 60. In FIG. 15B, holes 33 shown in FIG. 11B, into which the pawls 61 on the keypad bezel 60 are inserted, are formed at positions C—C on the key console unit 12. When the engagement pawls 61 of the keypad bezel 60 are inserted to the holes 33, removing the keypad bezel 60 is difficult.

Figure 15C:
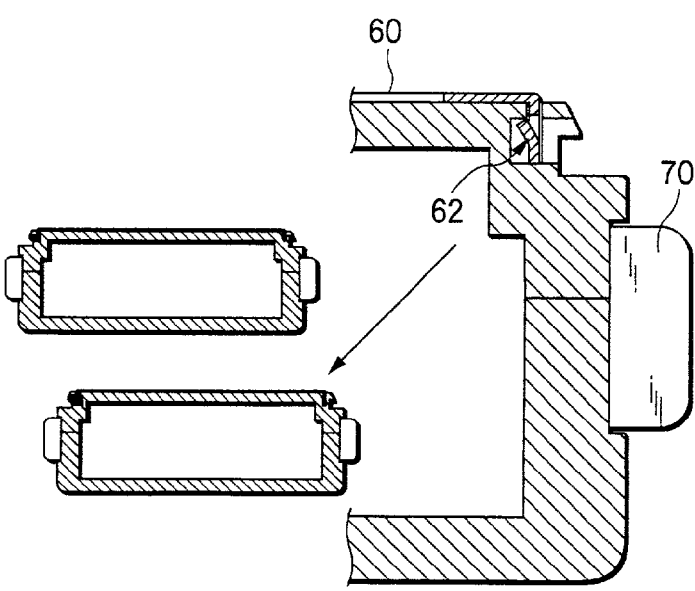
FIG. 15C is another cross-sectional view taken along line C—C in FIG. 15A.

FIG. 15C is another cross-sectional view taken along C—C in FIG. 15A, and an enlarged diagram shows the right side of the keypad bezel 60. In FIG. 15C, springs 62 are provided on the keypad bezel 60, and when the keypad bezel 60 is clamped down over the basic unit 20 at the position C—C, the springs 62 prevent it from being removed.

The keypad bezel 60 in FIGS. 15A to 15C corresponds to that in FIG. 6A. However, even though the mounting method differs, the keypad bezels 60 in FIGS. 6B to 6E may be employed.

Figure 16A:
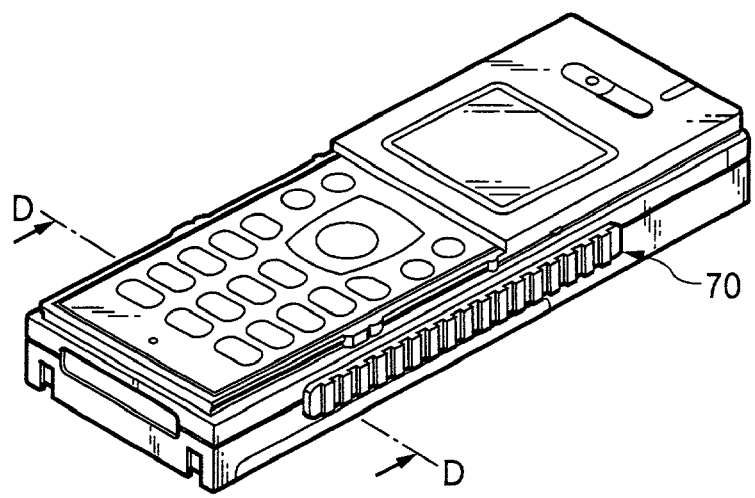
FIG. 16A is a perspective view of the state wherein the grips in FIG. 3 are mounted on the basic unit.

FIG. 16A is a perspective view of the state wherein the grips 70 in FIG. 3 are mounted on the basic unit 20. The grips 70 in FIG. 16A are fitted into the engagement holes 26, which are formed in the sides of the basic unit 20 in FIG; 1, and as is described above, the indentations formed in the sides of the grips 70 serve as grips.

Figure 16B:
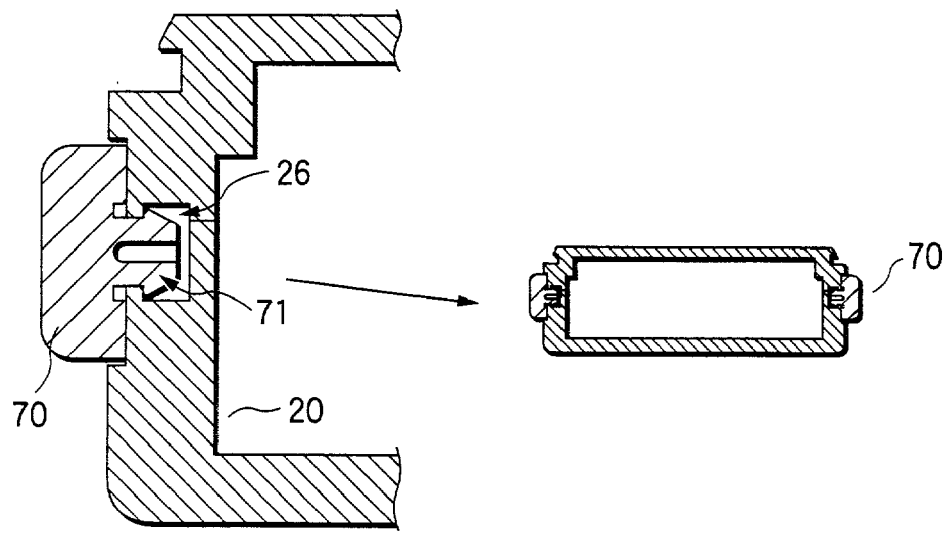
FIG. 16B is a cross-sectional view taken along line D—D in FIG. 16A.

FIG. 16B is a cross-sectional view taken along D—D in FIG. 16A. In FIG. 16B, to mount the grips 70, rubber caps 71 on the grips 70 are fitted into the engagement holes 26 in the basic unit 20.

The grips 70 in FIG. 16 correspond to those in FIG. 7A. However, even though the mounting method differs, the grips in FIGS. 7B and 7C may be employed.

Figure 17A:
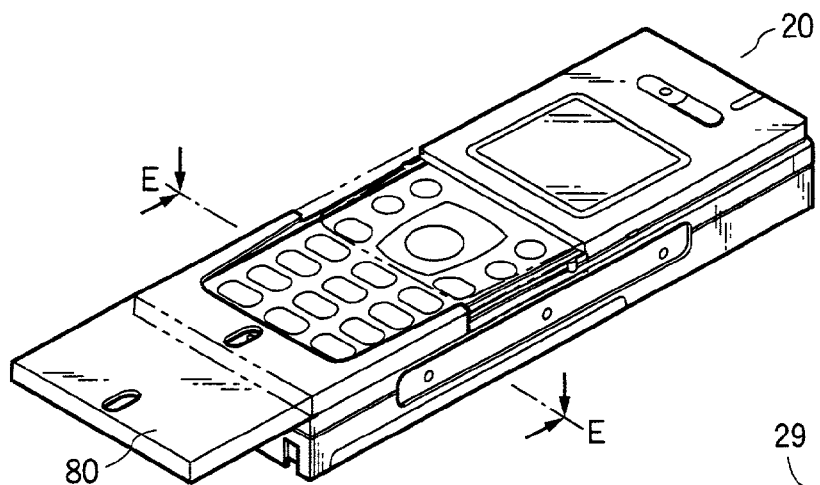
FIG. 17A is a perspective view of the state wherein a keypad slide cover is mounted.
Figure 17B:
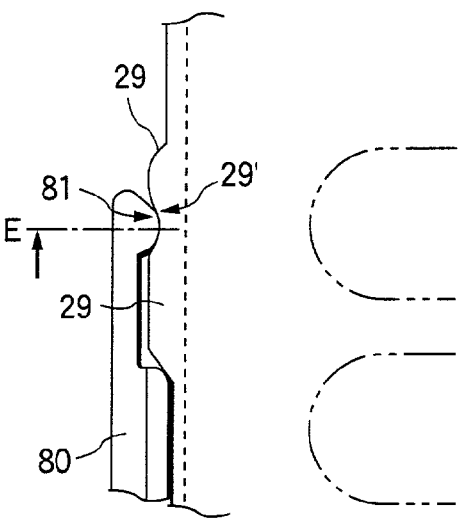
FIG. 17B is a top view of the left side of the device at along predetermined line E—E.

FIG. 17A is a perspective view of the state wherein the keypad slide cover 80 has been mounted. FIG. 17B is a top diagram showing the left side of the telephone at position E—E in FIG. 17A. The predetermined position E—E corresponds to the position whereat the keypad slide cover 80 is fully open. When protrusions 81, formed on the top of the keypad slide cover 80, engage recessed portions 29', in the rails 23, that correspond to the position of the hole for the microphone in the basic unit 20 and the position for the hole formed in the upper portion of the keypad slide cover 80, the voice of a speaker can be directly received by the microphone.

In FIG. 17B, the protrusions on the keypad slide cover 80, which is mounted along the rails 23 of the basic unit 20, is fixed in the recessed portions 29', formed in the middle of the engagement member 29. Thus, the protrusions 81 on the keypad slide cover 80 can be secured at the predetermined positions E—E.

Figure 17D:
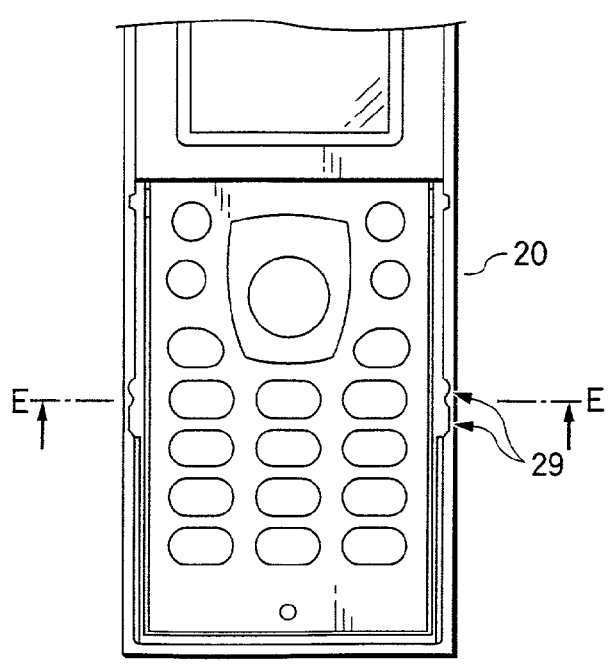
FIG. 17D is a diagram showing the line E—E for the basic unit.
Figure 17C:
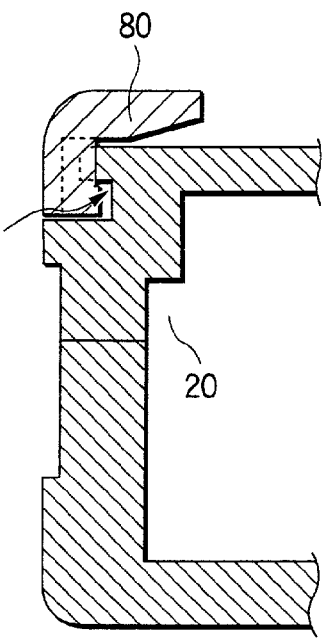
FIG. 17C is a cross-sectional view of the left side of the device taken along predetermined line E—E.

FIG. 17C is a cross-sectional view of the left side at the predetermined position E—E. From FIG. 17C, it can be readily understood that the protrusions on the keypad slide cover 80 engage the recessed portions 29' of the rails 23.

In FIG. 17D, the positions E—E in FIG. 17A are equivalent to positions E—E for the basic unit 20, and correspond to the middle positions (recessed portions 29') of the engagement members 29 on the rails 23. The keypad slide cover 80 in FIG. 17 corresponds to that in FIG. 8A; however, the keypad slide cover in FIG. 5B may also be employed.

Figure 18A:
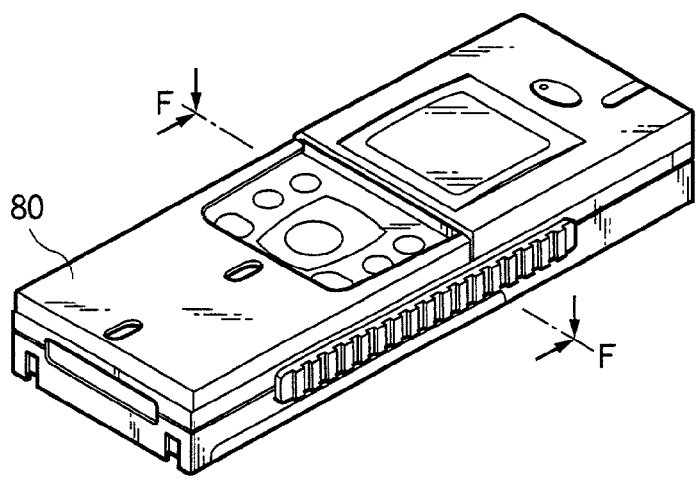
FIG. 18A is a perspective view of the state wherein a keypad slide cover is mounted.
Figure 18B:
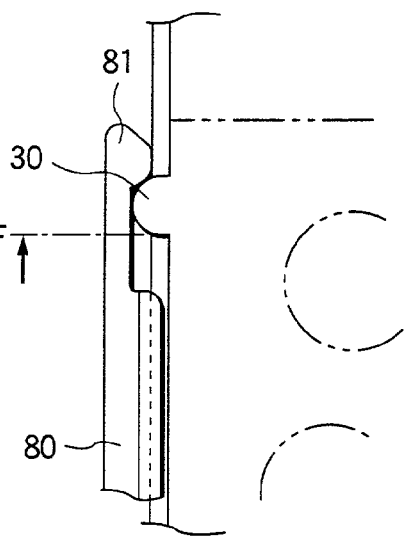
FIG. 18B is a top view of the left side of the device along line F—F.

FIG. 18A is a perspective view of the state wherein the keypad slide cover 80 has been mounted. FIG. 18B is a top view of the left side of the telephone at the position F—F in FIG. 18A. The predetermined positions F—F correspond to the positions below the engagement members 30 of the rails 23 when the keypad slide cover 80 is closed. When the protrusions 81 formed on the upper portions of the keypad slide cover 80 pass over the recessed portions of the engagement members 30 of the rails 23, the keypad slide cover 80 is closed and the position of the hole for the microphone in the basic unit 20 corresponds with the position of a hole formed in the lower portion of the keypad slide cover 80. Thus, the voice of a speaker can be directly received by the microphone.

In FIG. 18B, the protrusions 81, on the keypad slide cover 80 mounted along the rails 23 of the basic unit 20, pass over and engage the engagement member protrusions 30 formed on the rails 23. In this manner, the keypad slide cover 80 is maintained in the closed position.

Figure 18D:
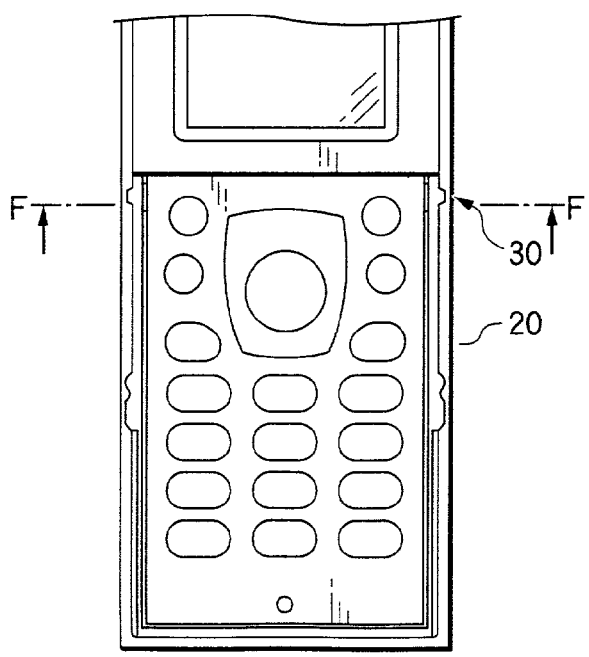
FIG. 18D is a diagram showing the predetermined line F—F for the basic unit.
Figure 18C:
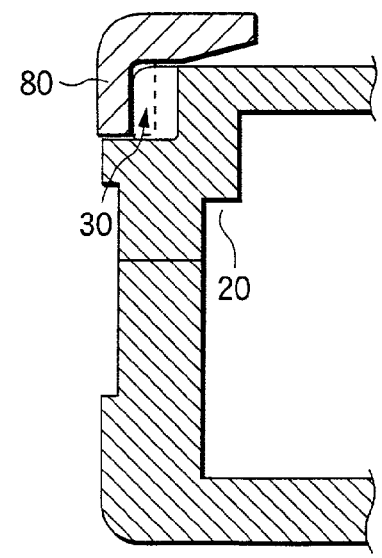
FIG. 18C is a cross-sectional view of the left side of the device taken along predetermined line F—F.

FIG. 18C is a cross-sectional view of the left side of the telephone taken along the line F—F. From this, it can be understood that the protrusions 81 on the keypad slide cover 80 engage the basic unit 20 by passing over the engagement member protrusions 30 on the rails 23.

In FIG. 18D, the positions F—F in FIG. 18A are equivalent to those of the basic unit 20, and correspond to the positions below the engagement member protrusions 30 on the rails 23. The slide cover 80 in FIG. 18 corresponds to the one in FIG. 9A; however, the slide cover in FIG. 9B may also be employed.

In the above explanation, basically, an example wherein additional function units are independently mounted on a basic unit has been explained. However, an example wherein multiple additional function units are assembled will now be described while referring to FIGS. 19 and 20.

Figure 19A:
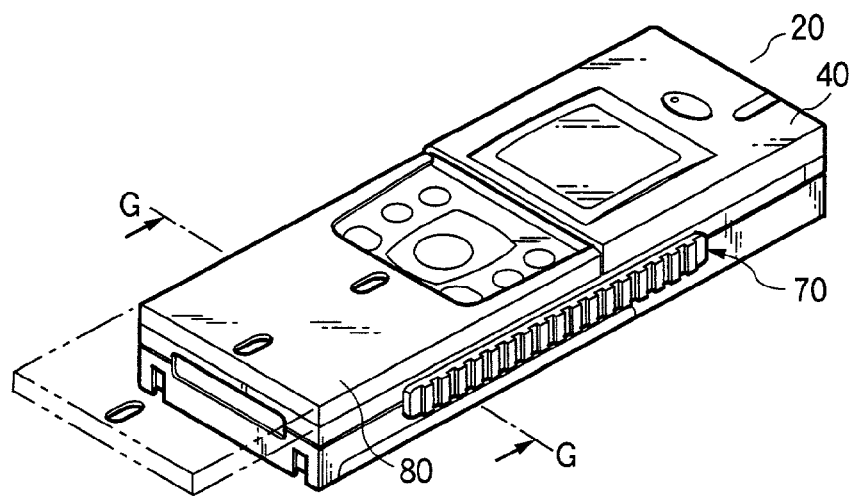
FIG. 19 is a diagram showing a first example wherein additional function units are assembled.

FIG. 19A is a diagram showing an example wherein the LCD bezel 40, the grips 70 and the keypad slide cover 80 are assembled as additional function units. Since the methods used to mount these units have already been explained, no further explanation for these procedures will be given here.

Figure 19B:
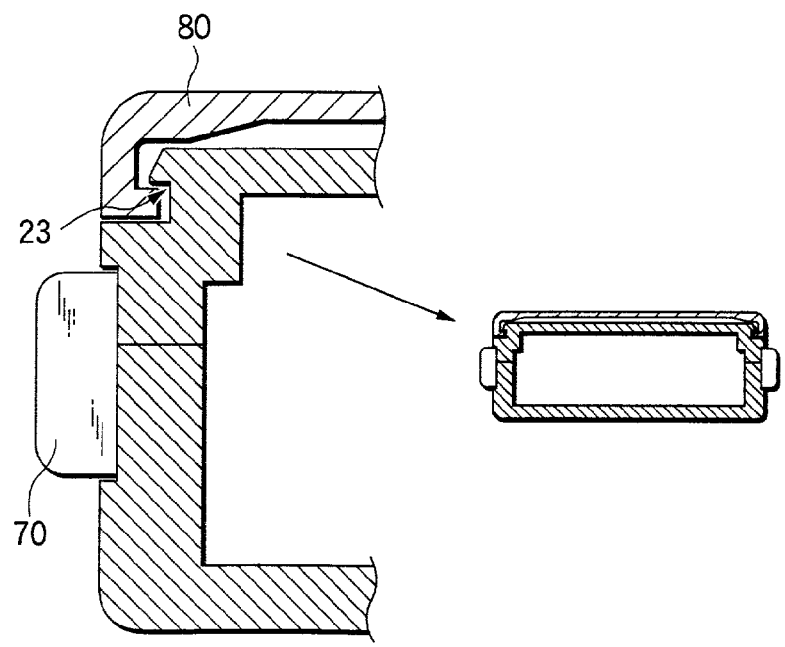

FIG. 19B is a cross-sectional view taken along line G—G in FIG. 19A. From FIG. 19B, it can be understood that the keypad slide cover 80 engages the rails 23 formed on the basic unit 20, and is prevented from being removed upward.

Figure 20:
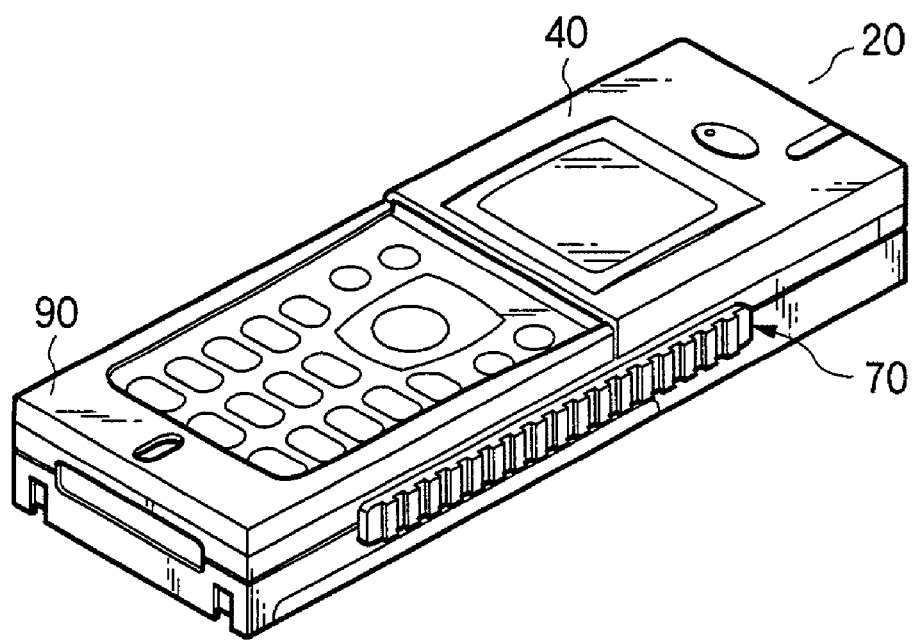
FIG. 20 is a diagram showing a second example wherein additional function units are assembled.

FIG. 20 is a diagram showing an example wherein the LCD bezel 40, the grips 70 and the slide cover 90 are mounted as additional function units. Since the methods used to mount these units have already been explained, no further explanation will be given here for these procedures.

Examples for the mounting of additional function units are not limited to those shown in FIGS. 19 and 20, and of course, a variety of additional function unit combinations can be employed by using the variations disclosed in this specification.

As is described above, according to the first aspect of the invention, a portable telephone comprises: a basic unit, in which essential components required for communication, i.e., a microphone, an earphone, a display unit, a key console unit, an antenna, a wireless communication unit, a power source and a controller, are stored in a case constituting a main body, and an additional function unit mounting section is provided for the basic unit for mounting an additional function unit, which provides an additional function, on the case of the main body. With this arrangement, since at any time after a portable telephone is purchased an additional function unit can be mounted thereon, the telephone can be altered to obtain a model favored by a user.

According to the second aspect of the invention, for the portable telephone of the first aspect, at least one of a flip unit, a slide unit, an LCD bezel unit, a keypad bezel unit and a grip unit can be mounted as the additional function unit. With this arrangement, since at any time after a portable telephone is purchased an additional function unit can be mounted thereon, the telephone can be altered to obtain a model favored by a user.

According to the third aspect of the invention, for the portable telephone of the first or the second aspect, the additional function unit mounting section includes at least one of a rail, an engagement section, which includes raised and recessed members, an attachment groove, and an engagement hole. With this arrangement, since at anytime after a portable telephone is purchased an additional function unit can be mounted thereon, the telephone can be altered to obtain a model favored by a user.

According to the fourth aspect of the invention, for the portable telephone of the first aspect, a single or multiple additional function units can be selected for mounting on the basic unit. With this arrangement, since at any time after a portable telephone is purchased one or more additional function units can be mounted thereon, the telephone can be altered to obtain a model favored by a user.

According to the fifth aspect of the invention, for the portable telephone of the first aspect, the additional function units available for counting on the basic unit are detachable. With this arrangement, it is easy to add, or remove, an additional function unit.

According to the sixth aspect of the invention, for the portable telephone of the first aspect, a grip having raised and recessed surfaces is formed on the sides of the additional function units, excluding the grip unit. This arrangement provides an improved grip for a user.

According to the seventh aspect of the invention, for the portable telephone of the first aspect, the grip surfaces of the grip unit are extended so as to serve as covers for protecting the sides of the case. This arrangement, as well as protecting the sides of the case, provides an improved grip for a user.

According to the eighth aspect of the invention, for the portable telephone of the first aspect, a magnifying lens is provided for the LCD bezel unit and the keypad bezel unit, and contents displayed on these units are enlarged for reading. With this arrangement, even a person having impaired vision can easily read the displayed contents.

What is claimed is:

1. A portable telephone comprising:
   a basic unit including components required for communication including a microphone, an earphone, a display unit, a key console unit, an antenna, a wireless communication unit, a power source, a controller, and a case body for accommodating said components; and
   an additional function unit mounting section provided on said case body of the basic unit for detachably mounting one or more of a plurality of additional function units each of which provide an additional function, wherein said additional function unit mounting section includes: a pair of rails provided on both side-faces of the case body, a plurality of engagement projections and recesses provided in a vicinity of said rails, a pair of attachment grooves provided at a bottom of the case body, and a plurality of engagement holes provided on both side faces of the case body.

2. The portable telephone according to claim 1, wherein said rails and engagement projections and recesses are capable of holding, a slide unit, and an LCD bezel unit, said attachment grooves are capable of holding a flip unit and said engagement holes are capable of holding a grip unit.

3. A portable telephone according to claim 1, wherein said additional function unit mounting section includes at least one of a rail, an engagement section, which includes raised and recessed members, an attachment groove, and an engagement hole.

4. A portable telephone according to claim 1, wherein multiple additional function units are selected for being mounted on said basic unit concurrently.

5. A portable telephone according to claim 1, wherein said additional function units available for mounting on said basic unit are detachable.

6. A portable telephone according to claim 1, wherein a grip having raised and recessed surfaces is formed on the sides of said additional function units, excluding said grip unit.

7. A portable telephone according to claim 1, wherein the grip surfaces of said grip unit are extended so as to serve as covers for protecting the sides of said case.

8. A portable telephone according to claim 1, wherein a magnifying lens is provided for said LCD bezel unit and said keypad bezel unit, and contents displayed on these units are enlarged for reading.

9. A portable telephone comprising:

a basic unit having the essential components required for communication including a microphone, an earphone, a display unit, a key console unit, an antenna, a wireless communication unit, a power source, a controller, and a case body; and an additional function unit mounting section provided on said case body, said additional function unit mounting section capable of mounting a plurality of additional function units concurrently, each additional function unit for providing an additional function.

10. A portable telephone comprising:

a basic unit having the essential components required for communication including a microphone, an earphone, a display unit, a key console unit, an antenna, a wireless communication unit, a power source, a controller, and a case body;

an additional function unit mounting section adapted for interchangeably attaching any one of a plurality of additional function units, wherein each one of said additional function units is adapted to provide a different function.

11. A portable telephone according to claim 10, wherein said plurality of additional function units include a flip unit, a slide unit, an LCD bezel unit, a keypad bezel unit and a grip unit.

12. A portable telephone according to claim 10, wherein said additional function unit mounting section includes at least one of a rail, an engagement section which includes raised and recessed members, an attachment groove, and an engagement hole.

13. A portable telephone according to claim 10, wherein said additional function unit mounting section is adapted for mounting a plurality of additional function units concurrently.

14. A portable telephone according to claim 10, wherein said additional function units available for mounting on said basic unit are detachable.

15. A portable telephone according to claim 10, wherein a grip having raised and recessed surfaces is formed on the sides of said additional function units, excluding said grip unit.

16. A portable telephone according to claim 10, wherein the grip surfaces of said grip unit are extended so as to serve as covers for protecting the sides of said case.

17. A portable telephone according to claim 10, wherein a magnifying lens is provided for said LCD bezel unit and said keypad bezel unit, and contents displayed on these units are enlarged for reading.

* * * * *